United States Patent [19]

Kelley

[11] Patent Number: 4,538,375

[45] Date of Patent: Sep. 3, 1985

[54] ANIMAL TRAP FOR GROUND MOLES AND THE LIKE

[76] Inventor: Albert W. Kelley, R.R. 1, Box 28, Creamridge, N.J. 08514

[21] Appl. No.: 543,494

[22] Filed: Oct. 19, 1983

[51] Int. Cl.³ .............................................. A01M 23/08
[52] U.S. Cl. ............................................ 43/77; 43/80; 43/60; 43/64; 43/65
[58] Field of Search .................. 43/77, 80, 60, 64, 65, 43/100, 66

[56] References Cited

U.S. PATENT DOCUMENTS

| | | | |
|---|---|---|---|
| 209,388 | 10/1878 | Edge | 43/80 |
| 1,007,758 | 11/1911 | White | 43/60 |
| 1,305,333 | 6/1919 | Anderson | 43/65 |
| 1,453,135 | 4/1923 | Hermanson | 43/100 |
| 1,638,767 | 8/1927 | Harmon | 43/65 |
| 2,488,466 | 11/1949 | Carver | 43/65 |
| 2,589,360 | 3/1952 | Ferguson | 43/65 |
| 2,683,951 | 7/1954 | Hamaker | 43/80 |
| 3,172,229 | 3/1965 | Swanson et al. | 43/65 |
| 3,320,692 | 5/1967 | Hellen | 43/65 |
| 3,341,967 | 9/1967 | Kelley | 43/65 |
| 3,925,922 | 12/1975 | Foltier | 43/80 |
| 4,107,867 | 8/1978 | Kennedy | 43/65 |

Primary Examiner—Nicholas P. Godici
Assistant Examiner—Kurt Rowan
Attorney, Agent, or Firm—Robert K. Youtie

[57] ABSTRACT

An elongate hollow body of frusto conical tubular formation having a plurality of internal prongs resiliently projecting obliquely into the hollow of the body obliquely away from the larger body end, and a closure on the smaller body end, the body being constituted of longitudinal sections swingable relative to each other for opening the body to remove an occupant.

6 Claims, 3 Drawing Figures

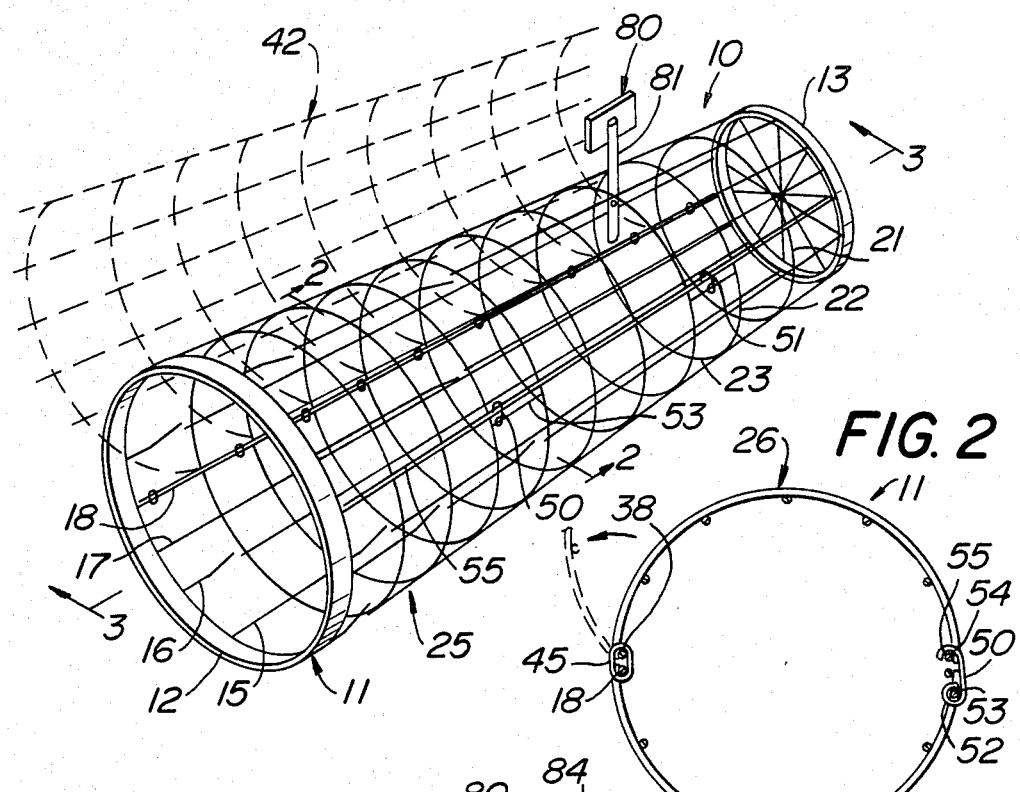
FIG. 1
FIG. 2
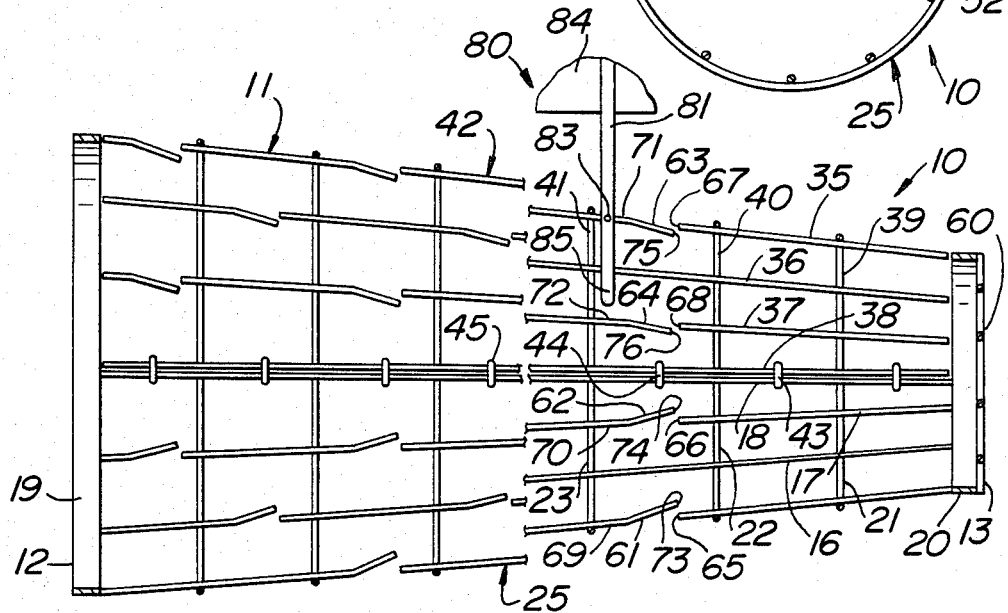
FIG. 3

ANIMAL TRAP FOR GROUND MOLES AND THE LIKE

BACKGROUND OF THE INVENTION

The field of animal traps has been well worked over and there have been proposed a variety of trap structures permitting of one way animal movement while obstructing return movement of an animal. This has been achieved in some prior devices with deflectable fingers to restrain against return movement. However, the prior art devices have been relatively large and ungainly in handling, difficult to remove and dispose of captured animals, and relatively expensive to manufacture.

Applicant is aware of the following prior art:

| U.S. PAT. NO. | PATENTEE |
| --- | --- |
| 1,638,767 | HARMON |
| 2,488,466 | CARVER |
| 2,589,360 | FERGUSON |
| 3,337,982 | SAJULAN |

SUMMARY OF THE INVENTION

It is an important object of the present invention to provide an animal trap which is extremely simple in construction so as to be relatively inperceptible to the animal for maximum trapping effectiveness.

It is another object of the present invention to provide an animal trap which permits of effective operation in covered condition, so as to be located underground if desired, to prevent accidental trapping of persons, dogs, and other undesired species.

It is still another object of the present invention to provide an animal trap which may be exposed, or partially exposed, sufficiently to enable a signal to indicate the presence of a trapped animal.

Still another object of the present invention resides in the provision of an animal trap having the advantageous characteristics mentioned in the preceding paragraphs, which is capable of quick and easy opening for removal of a trapped animal without handling.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWING

FIG. 1 is a front perspective view showing an animal trap constructed in accordance with the teachings of the present invention, trap shown in an open condition in phantom.

FIG. 2 is a transverse sectional view taken generally along the line 2—2 of FIG. 1.

FIG. 3 is a longitudinal sectional view taken generally along the line 3—3 of FIG. 1, broken away for conservation of drawing space.

DESCRIPTION OF THE PREFERRED EMBODIMENT

Referring now more particularly to the drawings, and specifically to FIG. 1 thereof, a trap is there generally designated 10, and includes a hollow body 11 of generally frusto conical configuration tapering from an open larger end 12 to a closed smaller end 13. The degree of taper may be selected as desired, preferably so that the animal intended to be trapped will not be aware of entering the trap until it is too late, as will appear more fully hereinafter.

More specifically, the conical body 11 is of an open wire-work construction including a plurality of generally straight longitudinal wire members, as at 15, 16, 17 and 18 in FIG. 3. The longitudinal wire members 15–18 lie longitudinally along the frustum of a cone and converge from left to right as seen in FIG. 3, having their more spaced ends secured to an end ring or band 19 at the relatively large body end 12, and having their lesser spaced ends secured to a smaller end ring or band 20 at the smaller body end 13. The longitudinal wire members are secured about approximately one half of each end band 19 and 20.

A plurality of generally parallel, arcuate wire members 21, 22 and 23 lie on the frustum of a cone in transverse planes thereof and are welded or otherwise secured at crossing regions to the longitudinal wire members. The arcuate wire members 21–23 are generally semicircular and arranged in parallel spaced relation at substantially equal intervals between the end bands 19 and 20.

The hereinbefore described lower longitudinal wire members 15–18 extending between and secured to the end bands 19 and 20, and the generally semicircular arcuate transverse wire members 21–23 combine to define a generally semifrusto conical tubular section 25, being the lower longitudinal section in the illustrated embodiment.

An upper longitudinal semifrusto conical section 26 includes a plurality of longitudinal members or wires 35, 36, 37 and 38 lying longitudinally along the same frustum of a cone as the longitudinal members 15–18. However, the upper longitudinal members 35–38 have their opposite end terminating just short of and free from the end rings 19 and 20, as seen in FIG. 3.

Securing together the several longitudinal members 35–38 are a plurality of generally semicircular, arcuate members 39, 40 and 41, lying in parallel spaced relation in planes normal to the axis of the frustum of a cone. That is, the transverse arcuate members 39–41 are spaced at intervals between the end bands 19 and 20, and suitably secured, as by welding, at their crossover points in respect to the longitudinal members from 35–38.

Thus, the combined openwork structure of longitudinal members 35–38 and transverse members 39–41 define a longitudinal, semifrusto conical section 42, complementary to the section 25 and combining with the latter in the closed, solid line condition to define the hollow frusto conical body 11.

The complementary sections 42 and 25 are swingably connected together by suitable hinge means, such as loops or eyes 43, 44 and 45 loosely encircling adjacent longitudinal members 18 and 38 to define hinge means swingably connecting together the sections 25 and 42.

Remote from the hinge loops or eyes 43–45, there may be provided one or more hooks, as at 50 and 51.

Each hook 50, 51 may have at one end an eye or loop 52 loosely coiled about a partial longitudinal member 53 secured between an adjacent pair of transverse members 21-23 for the purpose of holding the hook. The opposite hooked end 54 of the hook 50 is snap engageable about a longitudinal member 55 of the opposite longitudinal body section. That is, with the hook 50 swingably anchored to the partial longitudinal wire member 53 of the lower body section 25, the free hook end 54 is snap engageable about a longitudinal member 55 of the other body section 42.

Thus, the complementary longitudinal body sections 25 and 42 are swingable between the closed frusto conical defining condition shown in solid lines, and the open position showing the section 42 swung into position along side of and facing in the same direction as the section 25.

The smaller end of body 11, as at the ring or band 20, may be closed by a wire work end structure 60.

At spaced locations along each of the longitudinal members 15-18 of lower section 25 and 35-38 of upper section 42, the longitudinal members are cut and bent to define resilient prongs or fingers, as at 61, 62, 63 and 64, extending obliquely inwardly and toward the smaller closed end 13 of the hollow body 11. More specifically, each resilient finger, prong or tine is defined of a portion of a longitudinal wire or member by cutting and bending adjacent to the cut. The prongs or tines 61-64 have been cut, respectively, at 65-68, and bent respectively at 69, 70, 71 and 72. The cut and bend associated with each tine or prong is located between an adjacent pair of transverse or arcuate wires. The bends 69, 70, 71 and 72 deform the tines 61, 62, 63 and 64 obliquely inwardly and toward the closed body end 60, so that opposed tines, such as 61 and 63 are bent inwardly toward and terminate short of each other. By the resilience of the wire of longitudinal members 15-18 and 35-38, the tines are resiliently deflectable radially outwardly, as upon the movement of an animal through the internal passageway of the body 11 from the larger end 12 to the smaller end 13.

That is, an animal may move relatively freely inwardly along the internal passageway of hollow body 11 in the direction through the open end 12 and toward the closed end 13, while relatively freely deflecting the tines 61-64 radially outwardly, without consciously realizing the tines are being deflected. However, upon attempted backing out or turning around the animal will be effectively retained by engagement with the free ends 73, 74, 75 and 76 of the tines. Further inward movement of the animal may be made, but this only further restrains outward movement.

A signaling member or flag is generally designated 80, and includes an elongate member or arm 81 extending transversely into the section 42 of hollow body 11, in the illustrated embodiment. The arm is pivoted intermediate its ends at a point 83 for rotation about a transverse axis. A plate or signal device 84 is carried on one end of the arm 81, and the other end 85 may extend into the interior hollow of the body 11.

The trap 10 may be set in an animal run, trough or tunnel, as may be frequented by ground moles or other animals desired to be caught. In the set condition the openwork sections 25 and 22 are swung into their closed, complementary relation with the resilient tines extending into the hollow interior of the body obliquely away from the larger open entry end 12. If the flag 80 is exposed, it may be swung to the illustrated upstanding position; and upon entry of an animal the lower end 85 of the flag arm 81 will be swung upwardly to swing the signal portion 84 downwardly, and indicate the presence of an animal.

The trap 10 may be then readily opened, as by unsnapping the hooks 50 and 51 and swinging the section 42 outwardly, whereupon the body may be inverted to empty an animal into a suitable container for disposal.

From the foregoing it is seen that the present invention provides an animal trap which is extremely simple in construction and operation, with a mimimum of relatively simple parts, so as to be capable of inexpensive manufacture for sale at a reasonable price, and well adapted for reliable operation throughout a long useful life.

Although the present invention has been described in some detail by way of illustration and example for purposes of clarity of understanding, it is understood that certain changes and modifications may be made within the spirit of the invention.

What is claimed is:

1. An animal trap for ground moles and the like, said trap comprising an elongate tubular body fabricated of reticulated wirework material and having a longitudinal internal hollow open at one body end and closed at the other body end, said hollow defining a passageway tapering continuously inwardly from said one body end to the other, and a plurality of resilient prongs carried by said body at locations spaced longitudinally of and circumferentially about said body and projecting into said passageway, said prongs being formed from the wire of said wirework material and extending obliquely into said passageway away from said one body end, for impaling an animal having entered said passageway and attempting to return out of said passageway so that the animal continues further into said tapering passageway until immobilized against further movement both laterally and longitudinally.

2. An animal trap according to claim 1, said prongs extending obliquely inwardly toward and terminating short of each other, opposed prongs further from said one end extending more closely toward each other to define an inwardly reducing way for passage so that animals of widely varying sizes are caused to be immobilized against both lateral and longitudinal movement.

3. An animal trap according to claim 2, said body comprising a pair of longitudinal sections hingedly connected together for swinging engagement toward and away from each other into and out of a closed relation, and releasable fastener means retaining said sections in closed relation toward each other and releasable for opening of said sections away from each other, for lateral outward removal of an animal from said sections.

4. An animal trap according to claim 3, said body sections each comprising a semifrusto conical tubular formation, and an end wall on the smaller end of said body for closing the other end of said hollow.

5. An animal trap according to claim 1, said body comprising a wire-work frusto conical structure, and said prongs being defined by cut and inwardly bent wire portions of said structure.

6. An animal trap according to claim 5, in combination with an elongate signal element extending transversely into and pivotedly connected to said structure, for signaling the presence of an occupant in said structure.

* * * * *